Jan. 25, 1927.
E. P. GROS
1,615,542
COFFEE PERCOLATOR
Filed Feb. 26, 1926
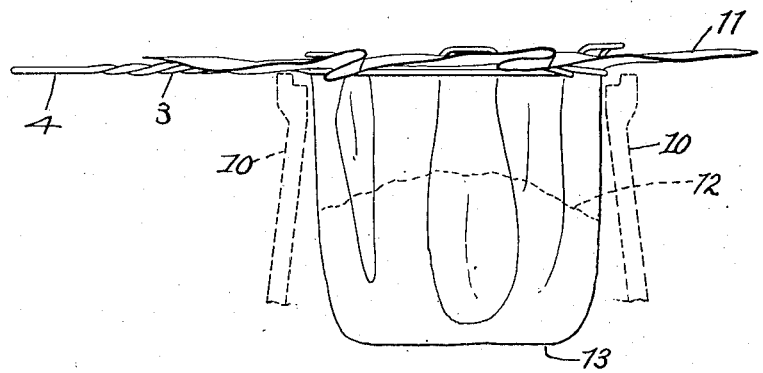
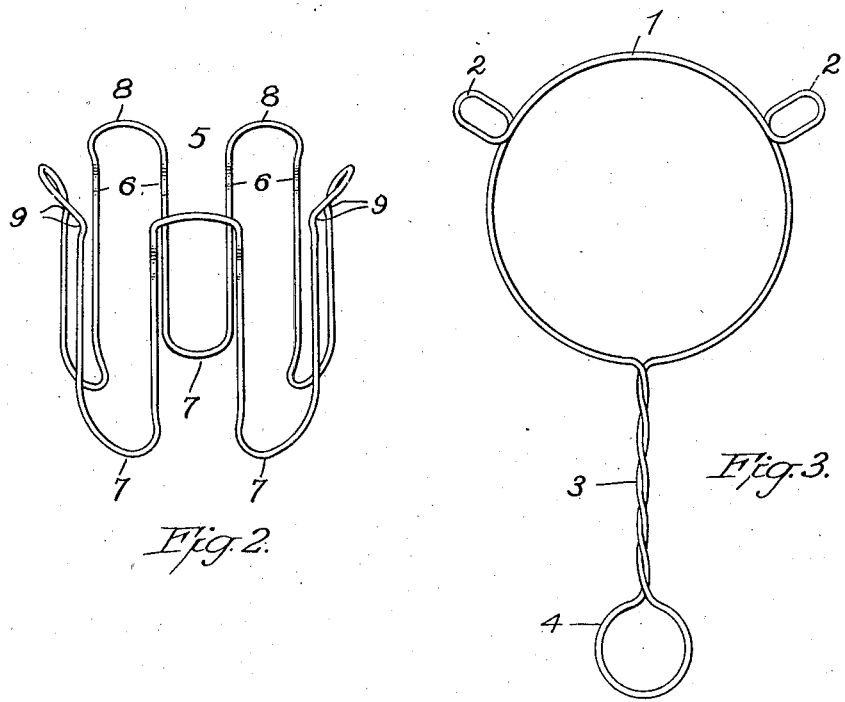
INVENTOR.
EDWARD P. GROS.
BY
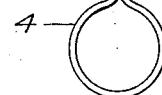
HIS ATTORNEYS.

Patented Jan. 25, 1927.

1,615,542

UNITED STATES PATENT OFFICE.

EDWARD P. GROS, OF CANAJOHARIE, NEW YORK.

COFFEE PERCOLATOR.

Application filed February 26, 1926. Serial No. 90,830.

My invention relates to coffee percolators and has for its object the providing of means to support a piece of fabric so that it forms a bag or container for the ground coffee within a coffee pot and through which hot water may be poured to make the coffee beverage. I accomplish this object by simple, efficient and economical means.

My invention will be fully understood from the following description taken in connection with the accompanying drawings and its scope will be pointed out in the appended claims.

In the drawings, Fig. 1 is a side elevation of the device comprising my invention showing the fabric or bag supported within a coffee pot. Fig. 2 is a perspective view of the inner frame. Fig. 3 is a plan view of the supporting ring and handle therefor.

Referring to the drawings, the numeral 1 indicates a supporting member preferably made of resilient wire and circular in form. Its diameter should be such as will allow the percolator to be inserted in coffee pots having small capacity and a minimum size of opening, but the supporting member or ring 1 is provided with supports preferably in the form of loops 2 and a handle 3, part of which serves as an additional support for the ring 1, and allows the frame to be supported in coffee pots of various sizes. The ring 1 when made of a single piece of wire may have the loops 2 formed from the material of the ring as shown in Fig. 3. The handle 3 may likewise be formed by twisting the material of the ring and is preferably provided with a circular loop 4 adapted to form an enlarged portion of the handle.

Fig. 2 illustrates the preferred form of the inner frame member 5 which is adapted to be inserted within and supported by the ring 1 as hereinafter explained. The frame 5 comprises a plurality of substantially parallel runs 6 forming loops providing approximately equidistant elements of an imaginary cylinder whose diameter is slightly greater than the diameter of the ring 1. The runs 6 have adjacent ends connected together alternately as shown by the numerals 7 and 8 in Fig. 2. The upper connecting portions 8 extend outward from the runs 6 which are curved inward to form notches, as indicated at 9. When the frame 5 is placed within the ring 1 these outwardly extending connecting portions 8 and the notches 9 determine the position of the ring 1 upon the frame 5 and support the said frame upon the ring when the parts are in position within a coffee pot.

The lower connecting portions 7 are turned slightly inward to facilitate insertion of the inner frame 5 within the ring 1 and to form slightly rounded edges of the container for the ground coffee.

It will be readily understood that this inner frame 5 is preferably made of a single piece of wire bent into the desired form and having its ends connected together in some suitable manner such, for example, as by welding so as to make a substantially integral or continuous frame.

Having now described the construction of my device the manner of using it will be apparent from the following brief description.

A circular piece of fabric 11 of sufficiently close mesh to prevent the passage of finely ground coffee therethrough is placed over the frame 5 when inverted. The ring or frame 1 is then drawn over the fabric and frame to form a bag of substantially cylindrical shape until the upper recesses or notches 9 of the runs 6 determine the position of the ring as shown in Fig. 1. The fabric 11 should be of such size that when the frame 5 is fully inserted within the ring 1 the edge of the cloth 11 extends slightly outside the ring 1. The resiliency of the frame 5 provides a spring pressure on the ring 1 which holds the fabric 11 firmly in position thereby obviating accidental displacement when supporting the comparatively heavy wet ground coffee. The wire frame and ring may be covered with any suitable enamel to prevent any chemical action with the liquid coffee solution. Ground coffee 12 may now be placed in the bag thus formed and the coffee pot is ready for use, when the ring 1 is placed on top of the pot 10 and supported thereon by the loops 2 and a portion of the lateral handle 3. The hot water poured into the container will pass through the body of ground coffee evenly thus giving extracts of uniform strength regardless of whether relatively large or small amounts of the extract are prepared.

My invention is not limited to the details of form and arrangement shown for various changes may be made therein without departing from the essentials of my invention.

I claim:

1. A coffee percolator comprising a separable supporting and retaining member, and an inner substantially cylindrical resilient frame having a circular series of longitudinal retaining elements substantially free at their lower ends, said member and frame being adapted to have fabric interposed between them, said fabric being held in position by the resiliency of said frame.

2. A coffee percolator comprising a separable supporting member, and an inner resilient frame adapted to be inserted within said ring and be supported thereby, said frame comprising a plurality of longitudinal runs having their ends connected together alternately at opposite ends to form loops, said parts being adapted to have fabric interposed between them, said fabric being held in position by the resiliency of said frame.

3. A coffee percolator comprising, a separable supporting member, and an inner resilient frame adapted to be inserted within said member and be supported thereby, said frame comprising a plurality of longitudinal runs forming loops and having their upper ends connected together, the connecting portions at one end of said frame being bent outward with respect to said runs to form stops, said member and frame being adapted to have fabric imposed between them, said fabric being held in position by the resiliency of said frame.

4. A coffee percolator comprising a separable supporting member having means for supporting the same on a coffee pot, and a resilient frame adapted to be inserted within said member and be supported thereby, said frame comprising a plurality of substantially parallel runs having their adjacent ends connected together alternately, the connecting portions at one extremity of said frame being bent outward, the connecting portions at the other extremity of said frame being bent inward, said member and frame being adapted to have fabric interposed between them when said frame is positioned within said member, said fabric being held between said member and said outward bent connecting portions by the resiliency of said frame, said frame constituting substantially an endless portion of wire or similar material.

5. In a coffee percolator, a shaping and retaining member, comprising a substantially continuous piece of resilient wire, forming a substantially cylindrical frame having longitudinal runs forming loops, said loops being connected together at their upper ends by outwardly curved portions and formed at their lower ends by rounded connecting portions.

EDWARD P. GROS.